United States Patent

[11] 3,595,543

[72] Inventor  Stewart W. Tresouthick
               McCandless Township, Allegheny County, Pa.
[21] Appl No   1,486
[22] Filed     Jan. 8, 1970
[45] Patented  July 27, 1971
[73] Assignee  United States Steel Corporation

[54] APPARATUS FOR AND METHOD OF TREATING AND COOLING CEMENT CLINKER
     30 Claims, 1 Drawing Fig.
[52] U.S. Cl. ............................................. 263/32 R,
                                              106/101, 263/53
[51] Int. Cl. ............................................. F27b 7/06
[50] Field of Search ............................. 263/32, 53;
                                                       106/101

[56]                References Cited
              UNITED STATES PATENTS
2,945,688   7/1960   Pajenkamp et al. ........... 263/32
3,276,755  10/1966   Bast ............................... 263/32
3,350,077  10/1967   Christensen .................... 263/32
3,425,853   2/1969   Rives .............................. 263/53 X Primary Examiner—John J. Camby
Attorney—Robert J. Leek, Jr.

ABSTRACT: This invention relates to an apparatus for and method of cooling and treating cement clinker discharged from a discharge end of a cement kiln, which kiln has a burner disposed adjacent the discharge end. The apparatus has a grate-type cooling means adapted to receive a bed of the cement clinker from the discharge end at a temperature of about 2,700° to 2,800° F. and to discharge the cement clinker at a temperature of about 350° F. The cooling means has a pressure zone for cooling the cement clinker from a temperature of about 2,500° to a temperature of about 1,850°. A first cooling means is disposed adjacent the pressure zone for directing a pressurized cooling fluid through the cooling means and through the bed to cool the cement clinker from a temperature of about 2,500° F. to a temperature of about 1,850° F and also to heat the cooling fluid to a temperature of about 400° to about 500° F. for use as secondary air for the burner. The cooling means also has a reduction and cooling zone adjacent the pressure zone for cooling and treating the cement clinker from a temperature of about 1,850° F. to a temperature of about 1,100° F. Gas generator means in the reduction and cooling zone direct a pressurized reducing fluid through the cooling means and through the bed to cool the cement clinker from a temperature of about 1,850° F. to a temperature of about 1,100° F. and to exit the reducing fluid from the reduction and cooling zone. Additionally, the cooling means has a cooling zone adjacent the reduction and cooling zone for cooling the cement clinker from a temperature of about 1,100° F. to a temperature of about 350° F. A second cooling means adjacent the cooling zone directs a pressurized cooling fluid through the cooling means and through the bed to cool the cement clinker from about 1,100° F. to about 350° F. and to heat the cooling fluid to a temperature of about 230° to 250° F. for use as primary air for the burner.

The method includes the steps of receiving a bed of the cement clinker on a grate-type cooling means from the discharge end at a temperature of about 2,700° to 2,800° F.; cooling the cement clinker in a pressure zone of the cooling means from a temperature of about 2,500° F. to a temperature of about 1,850° F. by directing a pressurized cooling fluid through the cooling means and through the bed to heat the cooling fluid to a temperature of about 400° to about 500° F. for use as secondary air for the burner; cooling the partially cooled cement clinker in a reduction and cooling zone adjacent the pressure zone of the cooling means from a temperature of about 1,850° F. to a temperature of about 1,100° F. by directing a pressurized reducing fluid through the cooling means and through the bed and to exit the reducing fluid from the reduction and cooling zone; and cooling the reduced cement clinker in a cooling zone adjacent the reduction and cooling zone from a temperature of about 1,100° F. to a temperature of about 350° F. by directing a pressurized cooling fluid through the cooling means and through the bed to heat the cooling fluid to a temperature of about 230° to 250° F. for use as primary air for the burner.

PATENTED JUL 27 1971   3,595,543
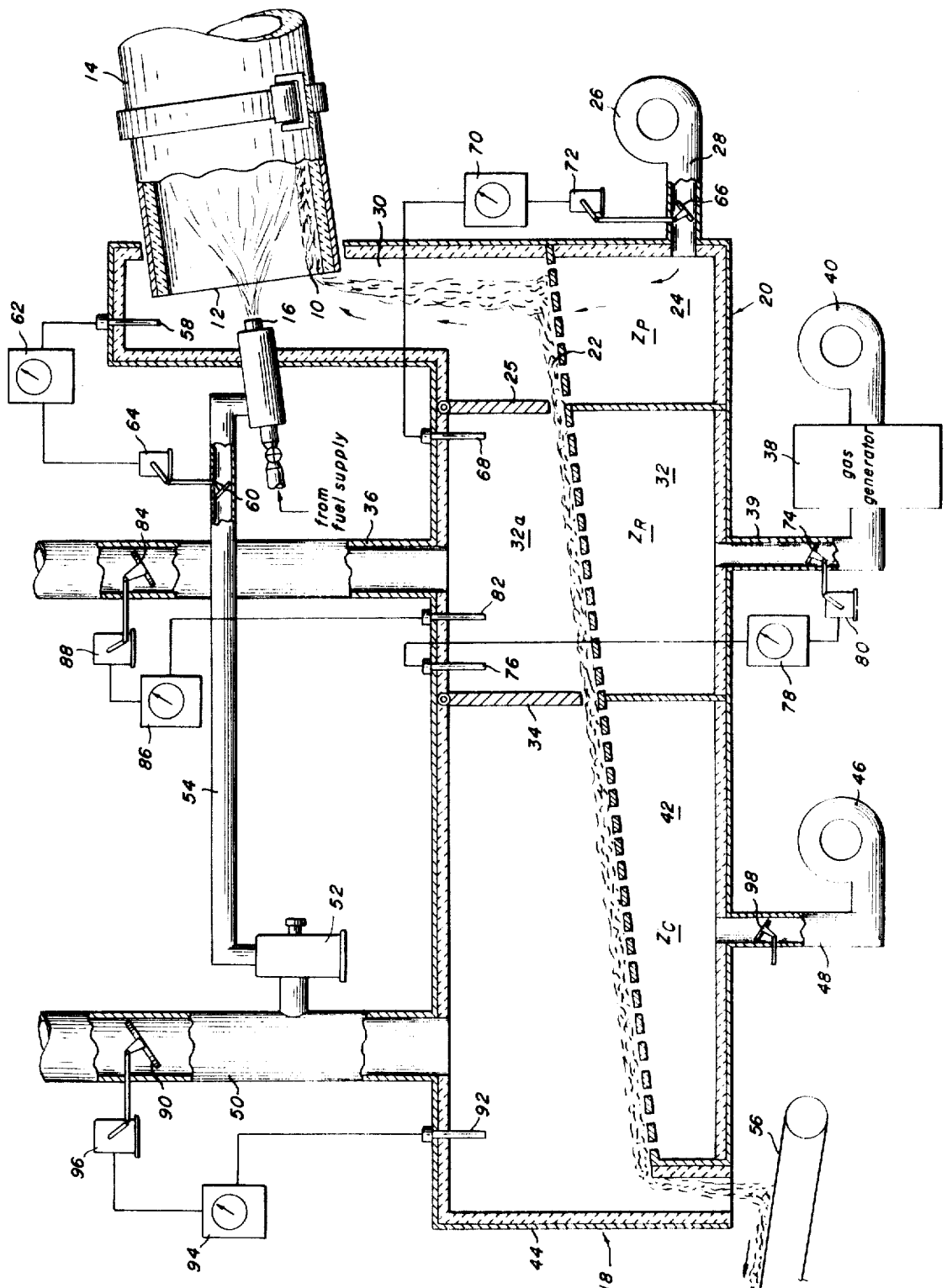
INVENTOR
STEWART W. TRESOUTHICK
By
his Attorney

APPARATUS FOR AND METHOD OF TREATING AND COOLING CEMENT CLINKER

BACKGROUND OF THE INVENTION

Heretofore, in the manufacture of white cement, a suitable raw material low in metallic oxides, such as iron oxide, manganese oxide, chrome oxide, etc., was used and burned in a rotary kiln using conventional methods to either rapidly quench the resultant clinker in a neutral medium, or to cool the clinker under reducing conditions.

Similarly, it is known in the art that water or steam quenching gray portland cement clinker, i.e., regular portland cement clinker will, within proper temperature and time limits produce a light buff clinker. Also, it is known that treating the same clinker with a chemical reductant under proper conditions of temperature and time will produce a light buff clinker. Both types of clinkers can be manufactured into a pleasing, desirable light buff-colored cement.

Conventional methods of treating the clinker require high maintenance and/or high fuel usage. The high fuel usage results from the wasting of all or most of the sensible heat in the clinker which is not returned to the heat input of the kiln thus lowering to a marked degree the thermal efficiency of the pyroprocess.

OBJECTS OF THE INVENTION

It is the general object of this invention to avoid and overcome the foregoing and other difficulties of and objections to prior art practices by the provision of a method of and apparatus for cooling and treating white and gray cement clinker, which method and apparatus:

1. utilize sensible heat in the clinker to recuperate a significant amount of thermal energy for reuse in the pyroprocess;
2. utilize a reducing atmosphere to cool the clinker from an upper temperature reaction limit of about 2,000° to 1,850° F. to a lower temperature limit of about 1,000° to 1,100° F. at which temperature the clinker will not react with oxygen in the air; and
3. supplying uniformly heated primary and secondary air to the combustion process for a more stable combustion process leading to a more uniform kiln operation.

BRIEF SUMMARY OF THE INVENTION

The aforesaid objects of this invention, and other objects which will become apparent as the description proceeds are achieved by providing an improved apparatus for and method of cooling a cement clinker. The apparatus has a grate-type cooling means adapted to receive a bed of the cement clinker from the discharge end of the kiln at a temperature of about 2,700° to about 2,800° F. and to discharge the cement clinker at a temperature of about 350° F. The cooling means has a pressure zone for cooling the cement clinker from a temperature of about 2,500° F. to a temperature of about 1,850° F. A first cooling means is disposed adjacent the pressure zone for directing a pressurized cooling fluid through the cooling means and through the bed to cool the cement clinker from a temperature of about 2,500° F. to a temperature of about 1,850° F. and also to heat the cooling fluid to a temperature of about 400° to about 500° F. for use as secondary air for the burner. The cooling means also has a reduction and cooling zone adjacent the pressure zone for cooling the cement clinker from a temperature of about 1,850° F. to a temperature of about 1,100° F. Gas generator means in the reduction and cooling zone direct a pressurized reducing fluid through the cooling means and through the bed to cool the cement clinker from a temperature of about 1,850° F. to a temperature of about 1,100° F. and to exit the reducing fluid from the reduction and cooling zone. Additionally, the cooling means has a cooling zone adjacent the reduction and cooling zone for cooling the cement clinker from a temperature of about 1,100° F. to a temperature of about 350° F. A second cooling means adjacent the cooling zone directs a pressurized cooling fluid through the cooling means and through the bed to cool the cement clinker from about 1,100° F. to about 350° F. and to heat the cooling fluid to a temperature of about 230° to 250° F. for use as primary air for the burner.

The method includes the steps of receiving a bed of the cement clinker on a grate-type cooling means from the discharge end of a kiln at a temperature of about 2,700° to 2,800° F.; cooling the cement clinker in a pressure zone of the cooling means from a temperature of about 2,500° F. to a temperature of about 1,850° F. by directing a pressurized cooling fluid through the cooling means and through the bed to heat the cooling fluid to a temperature of about 400° to about 500° F. for use as secondary air for the burner; cooling the partially cooled cement clinker in a reduction and cooling zone adjacent the pressure zone of the cooling means from a temperature of about 1,850° F. to a temperature of about 1,100° F. by directing a pressurized reducing fluid through the cooling means and through the bed and to exit the reducing fluid from the reduction and cooling zone; and cooling the reduced cement clinker in a cooling zone adjacent the reduction and cooling zone from a temperature of about 1,100° F. to a temperature of about 350° F. by directing a pressurized cooling fluid through the cooling means and through the bed to heat the cooling fluid to a temperature of about 230° to 250° F. for use as primary air for the burner.

BRIEF DESCRIPTION OF THE DRAWING

For a better understanding of this invention, reference should be had to the accompanying drawing wherein like numerals of reference indicate similar parts throughout the single view and wherein the sole figure is a diagrammatic view of the improved apparatus of this invention for cooling cement clinker.

Although the principles of this invention are broadly applicable to the cooling of all portland cement clinker, this invention is particularly adapted for use in conjunction with the cooling of white cement clinker and hence it has been so illustrated and will be so described.

DETAILED DESCRIPTION

With specific reference to the form of this invention illustrated in the drawing, an apparatus for cooling a cement clinker 10 discharged from a discharge end 12 of a cement kiln 14, is indicated generally by the reference numeral 18. The kiln 14 has a burner 16 disposed adjacent the discharge end 12.

This apparatus 18 has a grate-type cooling means, such as the grate-type cooler 20 of the type manufactured by the Fuller Company, Catasauqua, Pennsylvania and adapted to receive a bed 22 of cement clinker 10 which discharges from the kiln end 12 at a temperature of about 2,700° to about 2,800° F. and is about 2,500° F. at the cooler. The cooler 20 discharges the cement clinker 10 at a temperature of about 350° F. as hereinafter explained. The bed 22 of cement clinker 10 is disposed on the cooler 20 to a predetermined depth of about 8 inches to about 20 inches.

PRESSURE ZONE $Z_P$

The cooler 20 has a pressure zone $Z_P$ for cooling the cement clinker 10 from a temperature of about 2,500° F. to a temperature of about 1,850° F. The pressure zone $Z_P$ has a first predetermined length of about 10 percent to 15 percent of the total length of the cooler 20 and a retention time of about 6 to about 7 minutes. The pressure zone $Z_P$ is defined on one side of the cooler 20, (in this case the lower side of the cooler 20) by a pressure compartment 24. The other side of the pressure zone $Z_P$, (i.e., the top side thereof above the cooler 20) is defined by a first hanging baffle 25 and a cooler throat 30.

A first cooling means, such as the first fan 26, is disposed adjacent the pressure zone $Z_P$ or the pressure compartment 24 and connnected thereto by a conduit 28. Such first fan 26 directs a cooling fluid, such as ambient air or the like, at a pressure sufficient to pass the cooling fluid through the cooler 20 and the bed 22 of the cement clinker 10 to cool the cement clinker 10 from a temperature of about 2,500° F. to a temperature of about 1,850° F. and also to heat the cooling fluid to a temperature of about 400° to about 500° F. for use as secondary air for the burner 16. As shown in the drawing, such secondary air is conducted by the cooler throat 30 adjacent the discharge end 12 of the kiln 14 to the burner 16.

REDUCTION AND COOLING ZONE $Z_R$

The cooler 20 has a reduction and cooling zone $Z_R$ adjacent the pressure zone $Z_P$ for cooling the cement clinker 10 from a temperature of about 1,850° F. to a temperature of about 1,100° F. The reduction and cooling zone $Z_R$ has a second predetermined length of about 25 percent—30 percent of the total length of the cooler 20 and utilizes a retention time greater than about 10 minutes. Such reduction and cooling zone $Z_R$ is defined on one side of the cooler 20 (i.e. the lower side) by a reduction and cooling fluid plenum chamber 32 and on the other side (i.e. the top side) of the cooler 20 by the compartment 32a, first hanging baffle 25 and the second hanging baffle 34. For the purpose of exhausting the reducing gases, an exhaust means such as the exhaust stack 36 is provided in the reduction and cooling zone $Z_R$ or the reduction and cooling compartment 32. A gas generator means, such as the gas generator 38 of the type DX manufactured by Midland-Ross Corp., Toledo, Ohio, produces a reducing gas comprising approximately 80 percent $N_2$, 10 percent $CO_2$, a 4 percent mixture of CO and $H_2$ and 6 percent $H_2O$ at ambient temperature. A fan 40 directs such reducing fluid through a conduit 39, the cooler 20 and the bed 22 to cool the cement clinker 10 from a temperature of about 1,800° F. to a temperature of 1,100° F. and to exit the reducing fluid from the reduction and cooling zone $Z_R$ through the exhaust stack 36.

COOLING ZONE $Z_C$

Adjacent the reduction and cooling zone $Z_R$ the cooler 20 has a cooling zone $Z_C$ for cooling the reduced cement clinker 10 from a temperature of about 1,100° F. to a temperature of about 350° F. The cooling zone $Z_C$ has a third predetermined length of about 55 percent—65 percent of the total length of the cooler 20, and utilizes a retention time of about 20 to about 30 minutes. Such cooling zone $Z_C$ is defined on the lower side of the cooler 20 by a cooling fluid plenum chamber 42 and above the cooler 20 by the second hanging baffle 34 and an end section 44.

A second cooling means, such as the fan 46, is connected by a conduit 48 to the cooling fluid plenum chamber 42 and is utilized for directing a pressurized cooling fluid through the conduit 48, the cooler 20, and the bed 22 to cool the cement clinker 10 from a temperature of about 1,100° F. to a temperature of about 350° F. and also to heat the cooling fluid to a temperature of about 230° to 250° F. for use as primary air for the burner 16. The primary air for the burner 16 exits from the cooling compartment by way of an exhaust stack 50. A portion of the primary air is diverted by a fan 52 through a conduit 54 extending from the exhaust stack 50 to the burner 16.

As shown in the drawing, the cooled reduced cement clinker 10 falls off the cooler 20 onto a discharge conveyor 56.

CONTROL MEANS

HOOD PRESSURE CONTROL

For the purpose of maintaining a slightly negative pressure in the hood 30, such as about −0.05 inches of a water column, a first pressure sensing means, such as the sensor 58 of the type 252A manufactured by The Hayes Corporation, Michigan City, Indiana, is disposed in the hood or cooler throat 30 for sensing the pressure in the hood 30. A first damper means, such as the damper 60, is located in the conduit 54. A first control means, such as a recorder control 62 of the Furnace Pressure Controller type manufactured by Leeds and Northrup, Philadelphia, Pennsylvania is connected to the first sensor 58 and to a first actuator 64 of the type RC manufactured by Bailey Meter Company, Cleveland, Ohio, which first actuator 64 is in turn connected to the first damper 60.

REDUCTION AND COOLING ZONE
TEMPERATURE CONTROL

In order to maintain the cement clinker 10 at a temperature of about 1,850°, as the cement clinker 10 leaves the pressure zone $Z_P$, a second damper means, such as the second damper 66, is disposed in the conduit 28; a first temperature sensing means, such as the temperature sensor 68 of the type Rayotube manufactured by Leeds and Northrup Company is disposed in the top of the reduction and cooling compartment 32 adjacent the first baffle 25 to sense the entrance temperature of the gases to the reduction and cooling zone $Z_R$. A second control means, such as a second recorder controller 70 of the type H Speedomax manufactured by Leeds and Northrup Company, Philadelphia, Pennsylvania and a second actuator 72 of the type RC manufactured by Bailey Meter Company, Cleveland, Ohio are connected to the second damper 66.

REDUCING FLUID FLOW CONTROL

For the purpose of controlling the flow of the reducing fluid through the reduction and cooling zone $Z_R$, a third damper means, such as the third camper 74, is disposed in the conduit 39 between the gas generator 38 and the reduction and cooling compartment 32. A second temperature sensing means, such as the second temperature sensor 76, of the type Rayotube manufactured by Leeds and Northrup, Philadelphia, Pennsylvania, is disposed in the reduction and cooling zone $Z_R$ adjacent the exit portions thereof and the second baffle 34. A third controller means, such as the third recorder controller 78 of the type H Speedomax manufactured by Leeds and Northrup Company, Philadelphia, Pennsylvania, and an actuator 80 of the type RC manufactured by Bailey Meter Company are connected respectively to the second temperature sensor 76 and to the third damper 74.

PRESSURE CONTROL IN PRESSURE AND COOLING ZONE

In order to maintain a slightly positive pressure, such as about +0.05 inches of a water column, in the reduction and cooling zone $Z_R$, a second pressure sensor 82 of the type 252A manufactured by Hayes Company, Michigan City, Indiana, is disposed in the reduction and cooling zone $Z_R$. A fourth damper means, such as the fourth damper 84, is disposed in the exhaust stack 36 and a fourth control means, such as the fourth recorder controller 86 of the type H Speedomax manufactured by Leeds and Northrup Company, Philadelphia, Pennsylvania, is connected to the second pressure sensor 82. An actuator 88 of the type RC manufactured by Bailey Meter Company Cleveland, Ohio, is connected to the fourth recorder controller 86 and to the fourth damper 84.

PRESSURE CONTROL IN COOLING ZONE

To maintain a slightly negative pressure, such as about −0.05 inches of a water column, in the cooling zone $Z_C$, a fifth damper means, such as the fifth damper 90 is disposed in the exhaust stack 50. A third pressure sensing means, Type 252A-Hayes Company, such as the third pressure sensor 92, is inserted into the cooling zone $Z_C$ adjacent the discharge portions of the cooler 20 and is connected to a fifth controller recorder 94 of the type H Speedomax manufactured by Leeds and Northrup Company, Philadelphia, Pennsylvania. The control recorder 94 in turn is connected to an actuator 96 (similar to actuator 88), which actuator 96 is connected to the fifth damper 90.

COOLING FLUID FLOW CONTROL IN COOLING ZONE

For the purpose of controlling the flow of cooling fluid through the cooling zone $Z_C$, a sixth damper means, such as the sixth damper 98, is disposed in the conduit 48 and is operated manually to achieve the desired flow.

ALTERNATIVE EMBODIMENTS

It will be understood by those skilled in the art that alternatively the various control means shown in the sole figure of the drawing may be interchanged as desired to achieve a particular predetermined control pattern.

METHOD

It will be apparent to those skilled in the art from the above description of the apparatus that an improved method of cooling a cement clinker 10 has been disclosed. The method includes the steps of receiving a bed 22 of the cement clinker 10 on a grate-type cooler 20 from the discharge end 12 of a kiln 14 at a temperature of about 2,700° to 2,800° F.; cooling the cement clinker 10 in a pressure zone $Z_P$ of the cooler 20 from a temperature of about 2,500° F. to a temperature of about 1,850° F. by directing a pressurized cooling fluid through the cooler 20 and the bed 22 to heat the cooling fluid to a temperature of about 400° to about 500° F. for use as secondary air for a burner 16; cooling the partially cooled cement clinker 10 in the reduction and cooling zone $Z_R$ adjacent the pressure zone $Z_P$ of the cooler 20 from a temperature of about 1,850° F. to a temperature of about 1,100° F. by directing a reducing pressurized fluid through the cooler 20 and the bed 22 and to exit the reducing fluid from the reduction and cooling zone $Z_R$; and cooling the reduced cement clinker 10 in a cooling zone $Z_C$ of the cooler 20 adjacent the reduction and cooling zone $Z_R$ from a temperature of about 1,100° F. to a temperature of about 350° F. by directing a pressurized cooling fluid through the cooler 20 and the bed 22 and also to heat the cooling fluid to a temperature of about 230° to about 250° F. for use as primary air for the burner 16.

SUMMARY OF THE ACHIEVEMENT OF THE OBJECTS OF THE INVENTION

It will be recognized by those skilled in the art that the objects of this invention have been achieved by providing an improved apparatus for and method of cooling white cement clinker, which method and apparatus utilize sensible heat in the clinker 10 to recuperate a significant amount of thermal energy for reuse in the pyroprocess; utilize a reducing atmosphere to cool the clinker 10 from an upper temperature reaction limit of about 2,000 to about 1,850° F. to a lower temperature limit of about 1000 to about 1,100° F. at which temperature the clinker 10 will not react with oxygen in the air; and supplying uniformly heated primary and secondary air to the combustion process for a more stable combustion process leading to a more uniform kiln operation.

While in accordance with the patent statutes, preferred and alternative embodiments of this invention have been illustrated and described in detail, it is to be particularly understood that the invention is not limited thereto or thereby.

I claim:

1. Apparatus for cooling cement clinker discharged from a discharged from a discharge end of a cement kiln, said kiln having a burner disposed adjacent said discharge end, said apparatus having:
   a. grate-type cooling means adapted to receive a bed of said cement clinker from said discharge end at a temperature of about 2,700° to about 2,800° F. and to discharge said cement clinker at a temperature of about 350° F.;
   b. said cooling means having a pressure zone for cooling said cement clinker from a temperature of about 2,500° F. to a temperature of about 1,850° F.;
   c. a first cooling means adjacent said pressure zone for directing a cooling fluid through at a pressure sufficient to pass said cooling fluid through said cooling means and through said bed of said cement clinker to cool said cement clinker from a temperature of about 2,500° F. to a temperature of about 1,850° F., and to heat said cooling fluid to a temperature of about 400° to about 500° F. for use as secondary air for said burner;
   d. said cooling means having a reduction and cooling zone adjacent said pressure zone for cooling said cement clinker from a temperature of about 1,850° F. to a temperature of about 1,100° F.;
   e. gas generator means in said reduction and cooling zone for directing a reducing fluid having a pressure sufficient to pass said reducing fluid through said cooling means and through said bed to cool said cement clinker from a temperature of about 1,850° F. to a temperature of about 1,100° F. and to exit said reducing fluid from said reduction and cooling zone;
   f. said cooling means having a cooling zone adjacent said reduction and cooling zone for cooling said cement clinker from a temperature of about 1,100° F. to a temperature of about 350° F.; and
   g. a second cooling means adjacent said cooling zone for directing a cooling fluid having a pressure sufficient to pass said cooling fluid through said cooling means and through said bed to cool said cement clinker from a temperature of about 1,100° F. to a temperature of about 350° F. and to heat said cooling fluid to a temperature of about 230° F. to 250° F. for use as primary air for said burner.

2. The apparatus recited in claim 1 and having a first conducting means adjacent said discharge end for directing said cement clinker from said discharge end to said pressure zone and for directing said heated cooling fluid from said pressure zone to said discharge end for use as secondary air for said burner.

3. The apparatus recited in claim 1 and having a second conducting means for connecting said cooling zone with said burner and for directing said heated cooling fluid from said cooling zone to said burner as primary air.

4. The apparatus recited in claim 3 and having blower means in said second conducting means for blowing said heated cooling fluid through said second conducting means.

5. The apparatus recited in claim 1 wherein said pressure zone is defined by a pressure compartment on one side of said cooling means.

6. The apparatus recited in claim 5 wherein said pressure zone is defined by said pressure compartment, a kiln firing hood of said kiln and a first baffle on the other side of said cooling means.

7. The apparatus recited in claim 1 wherein said reduction and cooling zone is defined by a reduction and cooling compartment on one side of said cooling means.

8. The apparatus recited in claim 7 wherein said reduction and cooling zone is defined by said reduction and cooling compartment, a first baffle and a second baffle on the other side of said cooling means.

9. The apparatus recited in claim 1 wherein said cooling zone is defined by a cooling compartment on one side of said cooling means.

10. The apparatus recited in claim 9 wherein said cooling zone is defined by a second baffle and an end wall on the other side of said cooling means.

11. The apparatus recited in claim 1 wherein said bed has a predetermined depth.

12. The apparatus recited in claim 1 wherein said pressure zone has a first predetermined length and a retention time of about 6 to about 7 minutes.

13. The apparatus recited in claim 1 wherein said reduction and cooling zone has a second predetermined length and a retention time greater than 10 minutes.

14. The apparatus recited in claim 1 wherein said cooling zone has a third predetermined length and a retention time of about 20 to about 30 minutes.

15. A method for cooling a cement clinker discharged from a discharge end of cement kiln and having a burner disposed adjacent said discharge end, said method including the steps of:
   a. receiving a bed of said cement clinker on a grate-type cooling means from said discharge end, the clinker discharging at about 2,700° to 2,800° F.;
   b. cooling said cement clinker in a pressure zone of said cooling means from a temperature of about 2,500° F. to a temperature of about 1,850° F. by directing a cooling fluid at a pressure sufficient to pass said cooling fluid through said cooling means and through said bed of said cement clinker to heat said cooling fluid to a temperature of about 400° to about 500° F. for use as secondary air for said burner;
   c. cooling said partially cooled cement clinker in a reduction and cooling zone adjacent said pressure zone of said cooling means from a temperature of about 1,850° F. to a temperature of about 1,100° F. by directing a reducing fluid having a pressure sufficient to pass said reducing fluid through said cooling means and through said bed and to exit said reducing fluid from said reduction and cooling zone; and
   d. cooling said reduced cement clinker in a cooling zone of said cooling means adjacent said reduction and cooling zone from a temperature of about 1,100° F. to a temperature of about 350° F. by directing a colling fluid having a pressure sufficient to pass said cooling fluid through said cooling means and through said bed and to heat said cooling fluid to a temperature of about 230° to about 250° F. for use as primary air for said burner.

16. The method recited in claim 15 including the step of conducting said cement clinker from said discharge end to said pressure zone and directing said heated cooling fluid from said pressure zone to said discharge end for use as secondary air for said burner.

17. The method recited in claim 15 and including the steps of connecting said cooling zone with said burner and directing said heated cooling fluid from said cooling zone to said burner as primary air.

18. The method recited in claim 15 and including the step of blowing said heated cooling fluid from said cooling zone to said burner for use as primary air.

19. The apparatus recited in claim 1 and having a hood connecting said discharge end and said pressure zone, a second conducting means connecting said cooling zone with said burner, a first pressure sensing means in said hood for sensing the pressure in said hood, a first damper means in said second conducting means, and a first control means connected to said first damper means and said first pressure sensing means for maintaining a slightly negative pressure in said hood.

20. The apparatus recited in claim 1 and having a third conducting means connecting said cooling means and said pressure zone, a second damper means in said third conducting means, a first temperature sensing means in said reduction and cooling zone, and a second control means connected to said first temperature sensing means and said second damper means to vary the flow of said cooling fluid in said pressure zone and to maintain said cement clinker at about 1,850° F. as said cement clinker leaves said pressure zone.

21. The apparatus recited in claim 1 and having a fourth conducting means between said gas generation means and said reduction and cooling zone, a third damper means in said fourth conducting means, a second temperature sensing means in said reduction and cooling zone for sensing the temperature therein, a third control means connected to said third damper means and to said second temperature sensing means to control the flow of reducing fluid through said reduction and cooling zone.

22. The apparatus recited in claim 1 nd having a second pressure sensing means in said reduction and cooling zone, exhaust means from said reduction and cooling zone, a fourth damper means in said exhaust means, and a fourth control means connected to said second pressure sensing means and to said fourth damper means to maintain a slightly positive pressure in said reduction and cooling zone.

23. The apparatus recited in claim 1 and having a second exhaust means connected to said cooling zone, a fifth damper means in said second exhaust means, a third pressure sensing means in said cooling zone, and a fifth control means connected to said fifth damper means and to said third pressure sensing means to maintain a slightly negative pressure in said cooling zone.

24. The apparatus recited in claim 1 and having a fifth conducting means between said second cooling means and said cooling zone, and a sixth damper means in said fifth conducting means for controlling the flow of said cooling fluid through said cooling zone.

25. The method recited in claim 15 and including the steps of connecting said cooling zone with said burner, sensing the pressure adjacent said discharge end of said kiln, damping the primary air to said burner and controlling the damping of said primary air to said burner to maintain a slightly negative pressure adjacent said discharge end.

26. The method recited in claim 15 and including the steps of connecting said cooling means and said pressure zone, damping the flow of cooling fluid between said cooling means and said pressure zone, sensing the temperature in said reduction and cooling zone and controlling said damping between said cooling means and said pressure zone to maintain said cement clinker at about 1,850° F. as said cement clinker reaches said pressure zone.

27. The method recited in claim 15 and including the steps of connecting said reduction and cooling zone to a gas generation means, damping the flow of reducing fluid between said reduction and cooling zone and said gas generation means, sensing the temperature in said reduction and cooling zone. and controlling the damping of said reducing fluid between said reduction and cooling zone, and controlling the damping of said reducing fluid between said reduction and cooling zone and said gas generation means to control the flow of reducing fluid through said reduction and cooling zone.

28. The method recited in claim 15 and including the steps of sensing the pressure in said reduction and cooling zone, exhausting said reducing fluid from said reduction and cooling zone, damping the exhaust of said reducing fluid from said reduction and cooling zone, and controlling the damping of said exhaust of said reducing fluid to maintain a slightly positive pressure in said reduction and cooling zone.

29. The method recited in claim 15 and including the steps of exhausting said cooling zone, damping the exhaust of said cooling zone, sensing the pressure in said cooling zone, and controlling the damping of said exhaust of said cooling zone to maintain a slightly negative pressure in said cooling zone.

30. The method recited in claim 15 and including the steps of connecting said cooling zone to a second cooling means and damping the flow of said cooling fluid between said cooling zone and said second cooling means to control the flow of said cooling fluid through said cooling zone.